(12) United States Patent
Chen et al.

(10) Patent No.: US 8,373,409 B2
(45) Date of Patent: Feb. 12, 2013

(54) FAN SPEED TESTING SYSTEM AND METHOD

(75) Inventors: Xiang-Biao Chen, Shenzhen (CN); Yu-Lin Liu, Shenzhen (CN); Qiang Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 320 days.

(21) Appl. No.: 12/870,627

(22) Filed: Aug. 27, 2010

(65) Prior Publication Data

US 2011/0179865 A1  Jul. 28, 2011

(30) Foreign Application Priority Data

Jan. 26, 2010 (CN) .......................... 2010 1 0300732

(51) Int. Cl.
*G01P 3/486* (2006.01)
(52) U.S. Cl. ........................................ 324/175; 415/118

(58) Field of Classification Search .................. 324/175; 340/671; 416/61; 415/118
See application file for complete search history.

(56) References Cited

U.S. PATENT DOCUMENTS 4,195,291 A * 3/1980 Burks, Jr. ....................... 340/671
6,213,617 B1 * 4/2001 Barker ............................. 362/96

* cited by examiner

*Primary Examiner* — John Chapman, Jr.
(74) *Attorney, Agent, or Firm* — Altis Law Group, Inc.

(57) ABSTRACT

A fan speed testing system for testing a testing fan includes a testing fan, a collecting module, a processing module, a converting module; and a displaying module. A label is attached to the testing fan and capable of rotating with the testing fan. The collecting module is configured to collect light reflected off of the label as the fan rotates in order to produce a pulse signal. The processing module is configured to adjust the pulse signal to be a standard square wave. The converting module is configured to obtain a fan speed data of the testing fan according to conversion times between high levels and low levels of the standard square wave. The displaying module is configured to display the fan speed data.

12 Claims, 4 Drawing Sheets

FAN SPEED TESTING SYSTEM AND METHOD

BACKGROUND

1. Technical Field

The present disclosure relates to testing systems and methods, especially to a testing system and method for testing fan speed.

2. Description of Related Art

After computers are produced, quality tests are required. One of the tests is testing the fans of the computers. A conventional method to test the speed of the fans is using a tachometer. However, the conventional method requires opening the computer and manually positioning the tachometer close to the fan, which wastes time and manpower, and the tachometer is expensive.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
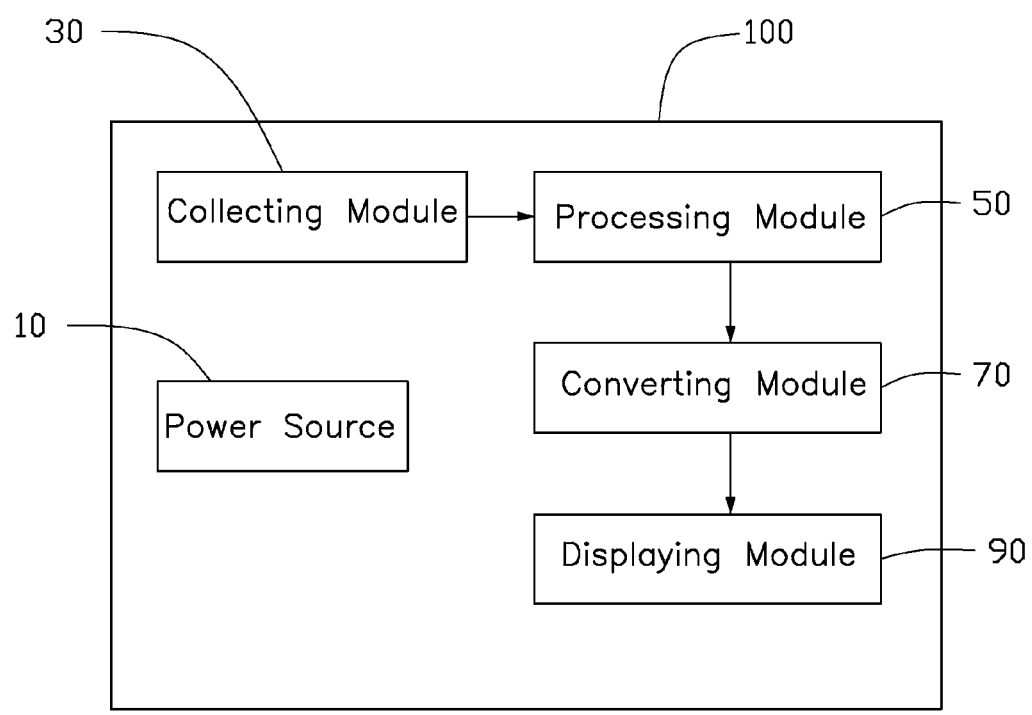
FIG. 1 is a block view of a fan speed testing system in accordance with an embodiment.

Referring to FIG. 1, a fan speed testing system 100 includes a power source 10, a collecting module 30, a processing module 50 connected to the collecting module 30, a converting module 70 connected to the processing module 50, and a displaying module 90 connected to the converting module 70.

Figure 2:
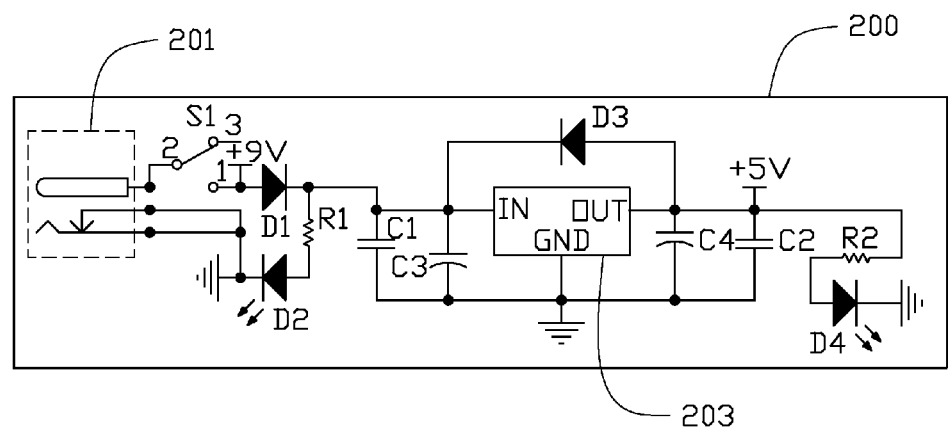
FIG. 2 is a circuit diagram of a voltage stabling circuit of the fan speed testing system in accordance with an embodiment.

Referring to FIG. 2, a voltage stabling circuit 200 is used in the power source 10. The voltage stabling circuit 200 includes a power input terminal 201 and a voltage stabling chip 203. In one embodiment, the voltage stabling chip 203 is a LM7805 chip. An input pin IN of the voltage stabling chip 203 is connected to the power input terminal 201 by a diode D1 and a power controlling switch S1, and connected to ground by a capacitor C1. A positive terminal of the diode D1 is connected to a +9V voltage source. A negative terminal of the diode D1 is connected to ground by a resistor R1 and a light-emitting diode (LED) D2. An output pin OUT of the voltage stabling chip 203 is connected to the input pin IN by a diode D3, and connected to ground by a capacitor C2. The input pin IN is connected to ground by a capacitor C3. The output pin OUT is connected to ground by a capacitor C4, and also connected to ground by a resistor R2 and a LED D4. A ground pin GND of the voltage stabling chip 203 is connected to ground. The voltage stabling chip 203 is used for converting +9V voltage at the input pin IN to +5V voltage at the output pin. The voltage stabling circuit 200 provides a +9V voltage source and a +5V voltage source. Wherein the +9V voltage source provides power to the collecting module 30 and the processing module 50, and the +5V voltage source provides power to the converting module 70 and the displaying module 90.

Figure 3:
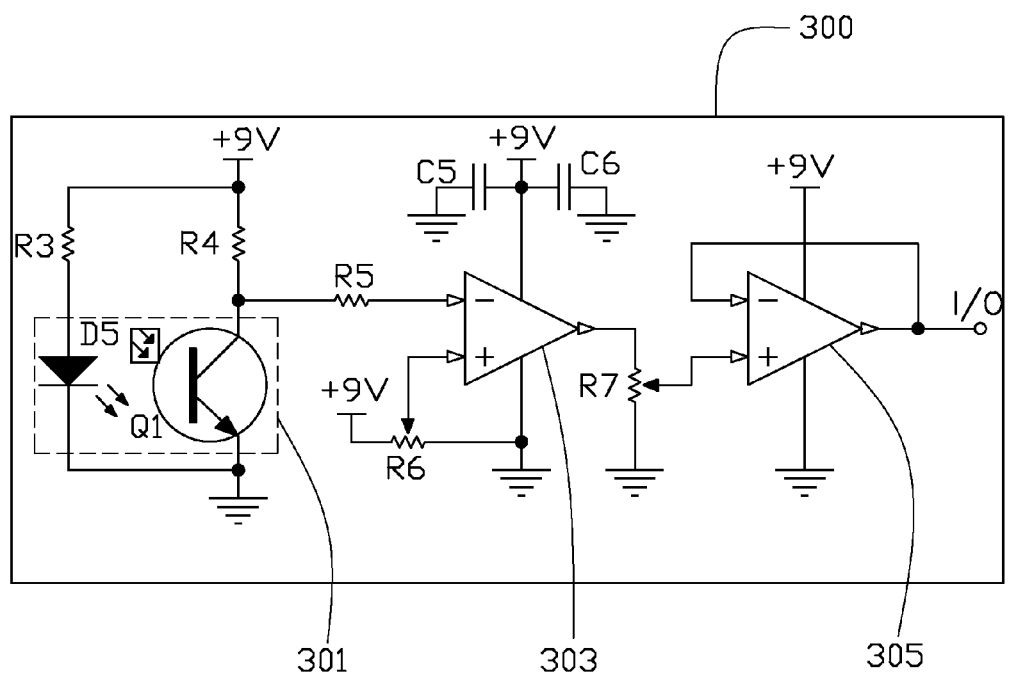
FIG. 3 is a circuit diagram of a frequency collecting and wave processing circuit of a fan speed testing system in accordance with an embodiment.

Referring to FIG. 3, a frequency collecting and wave processing circuit 300 is used in the collecting module 30 and the processing module 50. The frequency collecting and wave processing circuit 300 includes a reflecting infrared sensor 301, a first comparator 303 connected to the reflecting infrared sensor 301, and a second comparator 305 connected to the first comparator 303.

In one embodiment, the reflecting infrared sensor 301 is a ST178 chip. The reflecting infrared sensor 301 includes a LED D5 and a phototransistor Q1. A positive terminal of the LED D5 is connected to the +9V voltage source of the voltage stabling circuit 200 by a resistor R3, and a negative terminal of the LED D5 is connected to ground. A collector of the phototransistor Q1 is connected to the +9V voltage source by a resistor R4, and an emitter of the phototransistor Q1 is connected to ground. A positive input terminal of the first comparator 303 is connected to the collector of the phototransistor Q1 by a resistor R5. A negative input terminal of the first comparator 303 is connected to a wiper of a potentiometer R6. A terminal of the potentiometer R6 is connected to the +9V voltage source, and another terminal of the potentiometer R6 is connected to ground. A power terminal of the first comparator 303 is connected to the +9V voltage source, and respectively connected to ground by capacitor C5 and capacitor C6. A ground terminal of the first comparator 303 is connected to ground. An output terminal of the first comparator 303 is connected to a terminal of a potentiometer R7. A wiper of the potentiometer R7 is connected to a positive input terminal of the second comparator 305. Another terminal of potentiometer R7 is connected to ground. A negative input terminal of the second comparator 305 is connected to an output terminal I/O of the second comparator 305. A power terminal of the second comparator 305 is connected to the +9V voltage source, and a ground terminal of the first comparator 303 is connected to ground.

Figure 4:
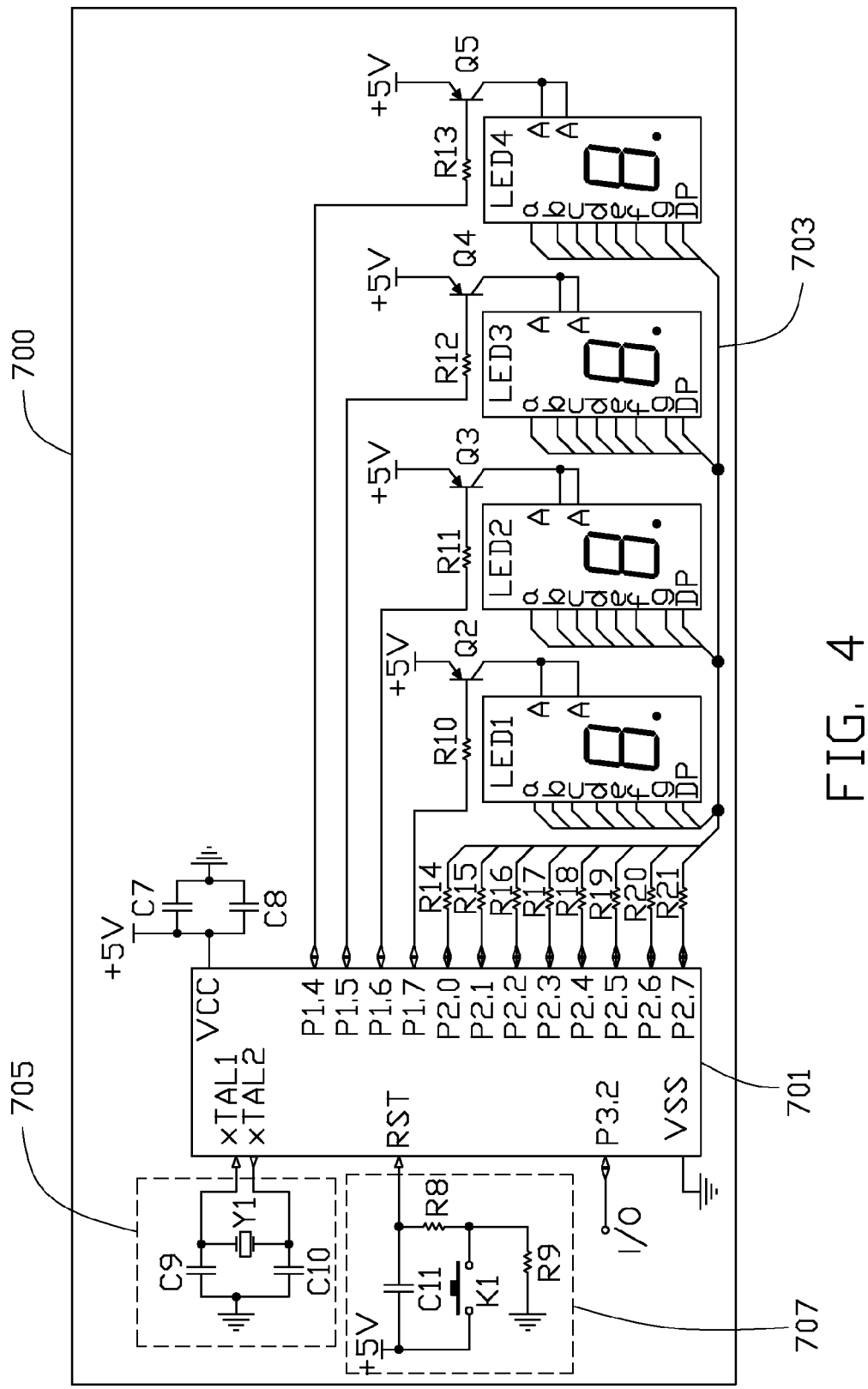
FIG. 4 is a circuit diagram of a converting and displaying circuit of a fan speed testing system in accordance with an embodiment.

Referring to FIG. 4, a converting and displaying circuit 700 is applied in the converting module 70 and the displaying module 90. The converting and displaying circuit 700 is used for receiving a pulse signal sent from the frequency collecting and wave processing circuit 300, converting the pulse signal to a fan speed data, and displaying the fan speed data. The converting and displaying circuit 700 includes a converting chip 701 and a displaying circuit 703. In one embodiment, the converting chip 701 is MCS-51 MCU. A power pin VCC of the converting chip 701 is connected to the +5V voltage source of the voltage stabling circuit 200, and connected to ground. A capacitor C7 and a capacitor C8 are connected in parallel. A ground pin VSS is connected to ground. Two clock pins XTAL1, XTAL2 are connected to a clock circuit 705. The clock circuit 705 includes a crystal oscillator Y1 and two capacitors C9 and C10. The crystal oscillator Y1 is connected between the clock pins XTAL1, and XTAL2. The clock pin XTAL1 is connected to ground by the capacitor C9, and the clock pin XTAL2 is connected to ground by the capacitor C10. A resetting pin RST of the converting chip 701 is connected to a control circuit 707. The control circuit 707 includes a switch K1. The resetting pin RST is connected to ground by resistor R8 and resistor R9. One terminal of the resistor R8 is connected to the +5V voltage source by the switch K1, and another terminal of the resistor R8 is connected to the +5V voltage source by a capacitor C11. The displaying circuit 703 includes four seven-segment displays. Pins P2.0-P2.7 are respectively connected to pins a, b, c, d, e, f, g, and DP of the four seven-segment displays. Pins 1.-1.7 are used for controlling the four seven-segment displays to be turned on or off. A Pin P3.2 is connected to the output terminal I/O of the frequency collecting and wave processing circuit 300.

Referring to FIGS. 1 to 4, the working principle of the fan speed testing system 100 is described below.

A label with an identifiable color is attached on a vane or blade of a testing fan. In one embodiment, the label is a white strip and the testing fan is black. When the fan speed testing system 100 is operational, light reflected off the label enables the phototransistor Q1 to be turned on if light from the LED D5 reflects off of the label. At this time, the phototransistor Q1 is in a first state. The phototransistor Q1 is turned off if light from the LED D5 reflects off of the other part of the testing fan. At this time, the phototransistor Q1 is in a second state. The label rotates when the vane or blade of the testing fan rotates, thereby the phototransistor Q1 is turned on intermittently, which makes the reflecting infrared sensor 301 produce a pulse signal. The pulse signal is amplified and adjusted by the first comparator 303 and the second comparator 305 to be a standard square wave. The square wave is delivered to the pin P3.2 of the converting chip 701. The converting chip 701 collects conversion times when the level falls from high to low in the square wave, which means the testing fan rotate one time. The converting chip 701 can calculate the fan speed data of the testing fan during a given period of time. The converting chip 701 delivers the fan speed data to displaying circuit 703 and the display circuit 703 displays the fan speed data.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan speed testing system for testing a testing fan, a label attached to the testing fan and capable of rotating with the testing fan, the fan speed testing system comprising:
    a collecting module, the collecting module is configured to collect light reflected off of the label as the testing fan rotates in order to produce a pulse signal;
    a processing module configured to adjust the pulse signal to be a standard square wave;
    a converting module configured to obtain a fan speed data of the testing fan according to conversion times between high levels and low levels of the standard square wave during a given period of time;
    a displaying module configured to display the fan speed data;
    the collecting module comprises a light-emitting diode and a phototransistor; light from the light-emitting diode is capable of reflecting off of the label, and the phototransistor is capable of being periodically turned on after collecting light reflected off of the label in order to produce the pulse signal;
    an emitter of the phototransistor is connected to ground, and a collector of the phototransistor is connected to a first voltage source via a resistor; and
    the processing module comprises a first comparator and a second comparator; a first negative input terminal of the first comparator is connected to the collector of the phototransistor, and a first positive input terminal of the first comparator is connected to a second voltage source; a first output terminal of the first comparator is connected to a second positive input terminal of the second comparator, a second negative input terminal of the second comparator is connected to a second output terminal of the second comparator, and the second output terminal is connected to the converting module.

2. The fan speed testing system of claim 1, wherein a potentiometer is connected between the first output terminal and the second positive input terminal, a first terminal of the potentiometer is connected to the first output terminal, a second terminal of the potentiometer is connected to ground, and a wiper of the potentiometer is connected to the second positive input terminal.

3. The fan speed testing system of claim 1, wherein a potentiometer is connected between the first positive input terminal and the second voltage source, a first terminal of the potentiometer is connected to the second voltage source, a second terminal of the potentiometer is connected to ground, and a wiper of the potentiometer is connected to the first positive input terminal.

4. The fan speed testing system of claim 1, wherein the converting module is configured to collect the conversion times between high levels and low levels of the standard square wave and calculate the fan speed data according to the conversion times during the given period of time.

5. The fan speed testing system of claim 1, wherein the displaying module comprises a plurality of seven-segment displays to display the fan speed data.

6. A fan speed testing method for testing a testing fan having a label able to reflect light, the label capable of rotating with the testing fan, the fan speed testing method comprising:
    providing a collecting module, a processing module, a converting module, and a displaying module;
    collecting light reflected off of the label via the collecting module in order to produce a pulse signal as the testing fan rotates;
    adjusting the pulse signal to be a standard square wave via the processing module;
    obtaining a fan speed data of the testing fan via the converting module according to conversion times between high levels and low levels of the standard square wave during a given period of time; and
    displaying the fan speed data via the displaying module;
    wherein the processing module comprises a first comparator and a second comparator; a first positive input terminal of the first comparator is connected to a second voltage source; a first output terminal of the first comparator is connected to a second positive input terminal of the second comparator, a second negative input terminal of the second comparator is connected to a second output terminal of the second comparator, and the second output terminal is connected to the converting module.

7. The fan speed testing method of claim 6, wherein the collecting module comprises a light-emitting diode and a phototransistor; light from the light-emitting diode is capable of reflecting off of the label; the phototransistor is capable of being periodically turned on after collecting light reflected off of the label in order to produce the pulse signal.

8. The fan speed testing method of claim 7, wherein an emitter of the phototransistor is connected to ground; a collector of the phototransistor is connected to a first voltage source via a resistor; and a first negative input terminal of the first comparator is connected to the collector of the phototransistor.

9. The fan speed testing method of claim 8, wherein a potentiometer is connected between the first output terminal and the second positive input terminal, a first terminal of the potentiometer is connected to the first output terminal, a second terminal of the potentiometer is connected to ground, and a wiper of the potentiometer is connected to the second positive input terminal.

10. The fan speed testing method of claim 8, wherein a potentiometer is connected between the first positive input terminal and the second voltage source, a first terminal of the potentiometer is connected to the second voltage source, a second terminal of the potentiometer is connected to ground, and a wiper of the potentiometer is connected to the first positive input terminal.

11. A fan speed testing system for testing a testing fan, a label attached to the testing fan and capable of rotating with the testing fan, the fan speed testing system comprising:
   a collecting module, the collecting module is configured to collect light reflected off of the label as the testing fan rotates in order to produce a pulse signal;
   a processing module configured to adjust the pulse signal to be a standard square wave;
   a converting module configured to obtain a fan speed data of the testing fan according to conversion times between high levels and low levels of the standard square wave during a given period of time; and
   a displaying module configured to display the fan speed data;
   wherein the processing module comprises a first comparator and a second comparator; a first positive input terminal of the first comparator is connected to a second voltage source; a first output terminal of the first comparator is connected to a second positive input terminal of the second comparator, a second negative input terminal of the second comparator is connected to a second output terminal of the second comparator, and the second output terminal is connected to the converting module.

12. The fan speed testing method of claim 11, wherein the collecting module comprises a light-emitting diode and a phototransistor; light from the light-emitting diode is capable of reflecting off of the label; the phototransistor is capable of being periodically turned on after collecting light reflected off of the label in order to produce the pulse signal; an emitter of the phototransistor is connected to ground; a collector of the phototransistor is connected to a first voltage source via a resistor; and a first negative input terminal of the first comparator is connected to the collector of the phototransistor.

* * * * *